Feb. 14, 1939.  J. C. REAR  2,146,850
REFRIGERATOR
Filed March 27, 1937
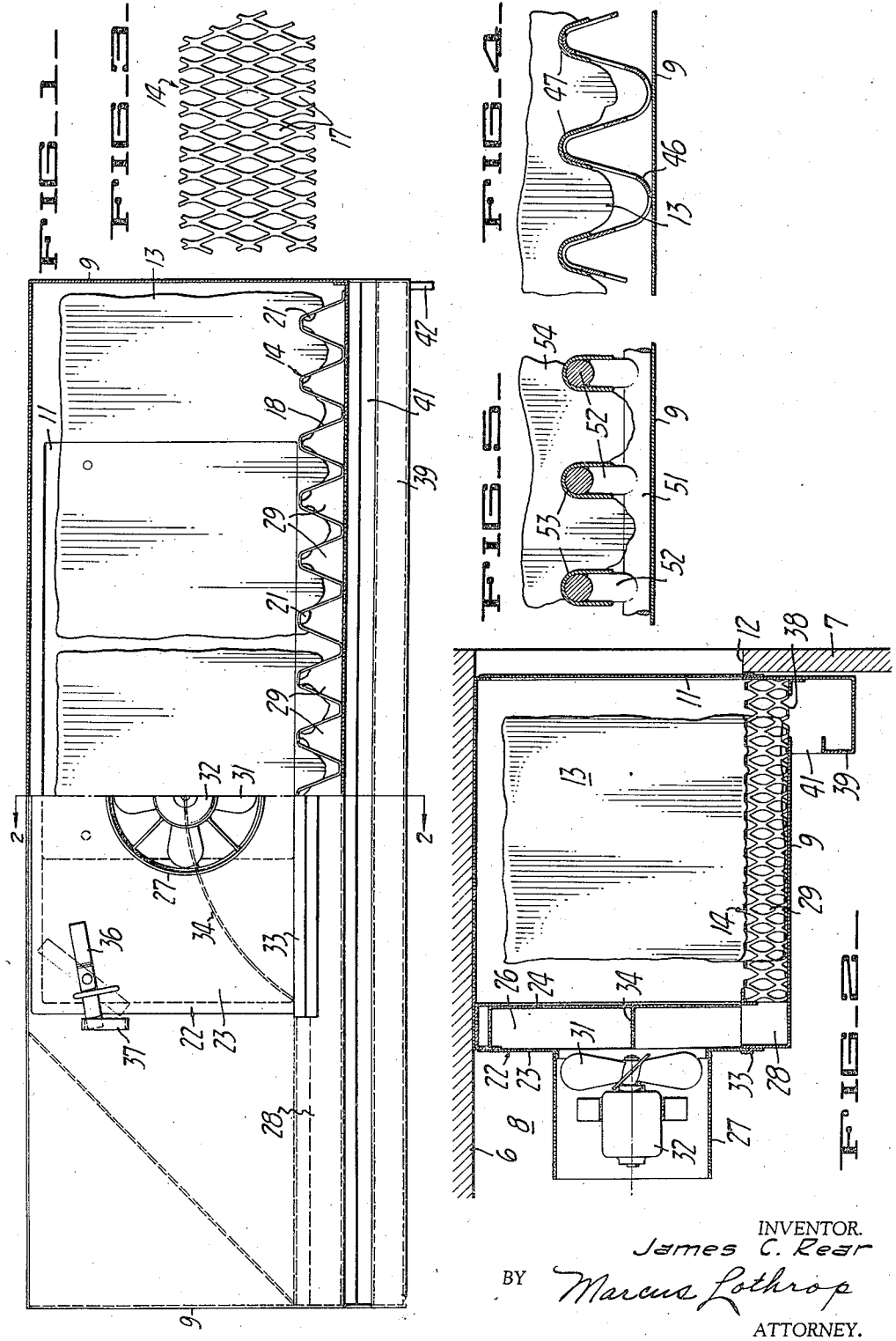
INVENTOR.
James C. Rear
BY Marcus Lothrop
ATTORNEY.

Patented Feb. 14, 1939

2,146,850

UNITED STATES PATENT OFFICE 2,146,850

REFRIGERATOR

James C. Rear, Berkeley, Calif., assignor to The Union Ice Company, San Francisco, Calif., a corporation of California Application March 27, 1937, Serial No. 133,424

5 Claims. (Cl. 62—72)

My invention relates particularly to means for utilizing a solid refrigerant such as ice, for reducing the temperature and for washing and properly humidifying the air in a generally closed chamber such as a vehicle body.

Particularly for the refrigeration of mobile vehicles, such as delivery trucks and vans, I have provided a simple, compact unit utilizing ice for affording adequate refrigeration for the interior thereof and the interior contents. One of the problems of some difficulty is to provide a unit in which the ice is not mechanically disintegrated and in which the ice will be relatively fixed in position throughout the entire melting period and will not be thrown about by the jostling and uneven movements of the vehicle.

It is therefore an object of my invention to provide a refrigerator in which the refrigerant, despite changes in its size, is firmly held in position.

Another object of my invention is to provide a refrigerator in which a relatively small refrigerator unit is capable of appropriately refrigerating a large space and a large quantity of contents.

A further object of my invention is to provide means for disposing of the melt from a refrigerant such as ice, and for supplying properly humidified air without excessive moisture.

The foregoing and other objects are attained in the embodiments of the invention illustrated in the drawing, in which—

Fig. 1 is, on the left half, an elevation of a refrigerator in accordance with my invention and, on the right half, a cross-section on a median plane of the refrigerator of my invention.

Fig. 2 is a cross-section the plane of which is indicated by the line 2—2 of Fig. 1.

Fig. 3 is a plan of an ice-supporting grid according to my invention.

Fig. 4 is a cross-section similar in part to the right-hand half of Fig. 1, showing a modified form of grid in accordance with my invention.

Fig. 5 is a view similar to Fig. 4, but showing a further modified form of grid in accordance with my invention.

In its preferred form, the refrigerator of my invention is adapted for use on a vehicle and includes a compartment for installation within the vehicle body, within which compartment is an ice-supporting grid preferably including a perforated sheet of corrugated material on which the refrigerant rests and interlocks, together with means for forcibly circulating air from the vehicle body through the compartment and under the grid in contact with the ice.

Although the invention can be embodied in a plurality of different forms, it is conveniently exemplified in the form shown herein wherein it is installed in a vehicle having a roof 6 and a wall 7 partially enclosing a storage compartment 8. At an appropriate location within the compartment 8 and preferably in an upper corner thereof, is installed transversely of the vehicle 10 a refrigerant compartment 9, preferably fabricated of sheet material suitably reinforced and including a sliding or otherwise movable panel 11 normally closing one part of the compartment 9 but shiftable to provide an opening thereinto from the opposite side of the wall 7, through which a passageway 12 extends, so that a block of ice 13 or other suitable relatively solid refrigerant can be introduced into the chamber 9 through the passageway 12.

For supporting the refrigerant within the compartment 9, I preferably mount on the floor thereof, which provides a suitable supporting framework, an ice-retaining grid 14. Since the device is intended primarily to be utilized in vehicles which pitch, lurch and otherwise partake of uneven and irregular movement, I have found that by manufacturing the grid in a particular manner I can hold the ice 13 in position without dislodgment despite changes in size and weight of the ice block as it melts.

To this end I dispose upon the framework formed by the bottom 9 of the compartment a grid 14 fabricated of a metal sheet having perforations 17 therethrough disposed at intervals over the surface thereof, and then preferably corrugate the sheet to provide an undulatory cross-section 18, as seen in Fig. 1. Preferably, commercial expanded metal sheeting is utilized, which comes in planar form with diamond-shaped or lozenge-shaped apertures 17 pierced therethrough. This is ordinarily heavily galvanized and is readily susceptible to pressing or forming into the undulatory character shown in the figure.

When the ice is supported upon the grid 14, it melts more rapidly in contact with the thermally conducting material of the grid, which is usually metal, than elsewhere, so that portions of the ice block extend through the apertures 17 and depend therefrom, thereby interlocking the ice block with the grid in such a way that even an extraordinary amount of jostling and movement of the vehicle in no wise dislodges the ice block, which remains firmly held in position even though it has almost entirely melted. At the same time there is exposed a very large superficial refrigerant area, so that the transfer of heat is extremely effective, efficient and rapid, being out of proportion to that usually obtained from refrigerant compartments of comparable size.

In order further to augment the transfer of heat and to control the refrigeration to a nicety, I preferably provide means for forcing a circulation of air to flow in direct contact with the depending portions 21 of the ice block 13 and throughout the interior of the body 8. For this reason the compartment 9 is partially sealed by a detachable panel 22 composed largely of a pair of parallel metal sheets 23 and 24 spaced apart to define a passageway 26 therebetween. The passageway communicates with the interior of the body 8 through a sleeve 27, and likewise communicates with the underside of the grid 14 by a passage 28 opening in common into all of the spaces 29 beneath the corrugations of the sheet 4.

Within the sleeve 27 I mount a propeller 31 or other suitable air-forcing means, preferably driven by an electric motor 32 or comparable driving mechanism which ordinarily is thermostatically controlled in accordance with the temperature within the body 8. To afford a more uniform distribution of air discharged from the interior of the body 8 through the fan 31 into the passage 26, I dispose an arcuate baffle 34 within the passage, which in general distributes the air discharged from the fan laterally into the passage 28 so that it flows uniformly underneath the grid 14. The panel 22 is readily detachable since it rests upon a supporting bracket 33 secured to the compartment 9 and is held in place by locking levers 36 engaging keepers 37 secured to the compartment 9. If desired, the panel 22 may be removed for the introduction of a refrigerant, such as the ice blocks 13, into the compartment, although preferably access thereto is had through the passageway 12.

Air which passes through the channels 29 is properly cooled, is washed by the melting ice, and is properly humidified by contact directly with the ice, and then passes with whatever water, melted from the ice, is entrained therewith, out of the compartment 9 through an opening 38 in the bottom wall thereof which is disposed immediately above a laterally extending metal trough 39 which, however, is partially spaced from the bottom wall of the compartment 9 to afford an outlet aperture 41 into the body 8. Due to the sharply curved path of flow of the air, the excess entrained water is thrown into the trough 39, wherefrom it drains through an outlet pipe 42 to the exterior of the body 8, and the remaining properly humidified air is restored to the body 8 for recirculation by the fan.

The grid may be constructed somewhat differently from the arrangement shown in Figs. 1 and 3. In Fig. 4, although the undulatory perforated metal sheet 46 is utilized, the ridges of the undulations, which normally are rounded and relatively smooth, are in addition provided with inverted rounded channels 47 in the form of caps overlying the peaks of the undulatory ridges, in order that there will be less ice melting over the sharper tops of the ridges than there will be farther down the sides thereof, so that in this fashion the area under the ice for air flow is somewhat restricted and the ice blocks may be more readily slid into position through the openings 12 or when the panel 22 is removed, yet nevertheless melt into interlocking engagement with the undulatory grid.

In Fig. 5 a substitute arrangement is shown, in which the grid preferably comprises side bars 51 to which are welded or otherwise fastened the longitudinal, upwardly arched bars 52, preferably flat along their upper surfaces and provided with hoods or caps 53 amounting to inverted channels, so that the ice block 54 resting thereon extends down the sides of the caps and is well held against lateral dislodgment, is reasonably well held against fore-and-aft dislodgment, but can be shifted somewhat in a fore-and-aft direction for rearrangement upon reicing.

I claim:

1. A refrigerator comprising a vehicle body, a grid within said body for supporting a refrigerant, said grid being perforated and corrugated to interengage with a block of ice resting thereupon, a sheet beneath said grid for receiving water melted from said ice, said sheet having an opening therein, a trough beneath said opening to receive water therefrom but having a lateral aperture therein, and means for circulating air from said body beneath said grid and through said opening and said aperture.

2. A refrigerator comprising a vehicle body, a refrigerant compartment within said body, means within said compartment for supporting a refrigerant including a corrugated grid having perforations in the upper part of the corrugations through which the refrigerant can depend, and means for forcibly circulating air through said body and beneath said grid in contact with said depending refrigerant.

3. A refrigerator comprising a vehicle body, a refrigerant compartment within said body, a grid within said compartment having apertures therein for interengaging depending portions of a refrigerant supported thereupon, means below said grid for admitting air from said body to flow beneath said grid, means for forcing air to circulate from said vehicle body through said admitting means and under said grid, and means for separating and receiving liquid entrained with said air.

4. A refrigerator comprising a storage room, a refrigerant compartment within said room, a refrigerant-supporting grid within said compartment, said grid having passages therethrough into which a refrigerant is adapted to project to preclude lateral movement of said refrigerant in all directions, means in said compartment opening into said room and defining air passages for directing air flow beneath said grid only, and means mounted upon said compartment for forcing air from said room to flow through said passages and in contact with said refrigerant.

5. A refrigerator comprising a vehicle body, a grid within said body for supporting a refrigerant, said grid being perforated to permit depending portions of a block of ice to project therethrough, means for forcing air from said body to flow under said grid in a predetermined direction and in contact with said depending portions, and means adjacent one end of said grid for reversing the direction of flow of air which has passed thereunder.

JAMES C. REAR.